J. HEIMLICH & L. O. DEHNEL.
Hose Relief Gate.

No. 212,601. Patented Feb. 25, 1879.

UNITED STATES PATENT OFFICE.

JOHN HEIMLICH, OF VENICE, AND LOUIS O. DEHNEL, OF SANDUSKY, ASSIGNORS OF ONE-THIRD THEIR RIGHT TO CHARLES HEIMLICH, OF VENICE, OHIO.

IMPROVEMENT IN HOSE RELIEF-GATES.

Specification forming part of Letters Patent No. 212,601, dated February 25, 1879; application filed December 13, 1878.

*To all whom it may concern:*

Be it known that we, JOHN HEIMLICH, of Venice, in the county of Erie and State of Ohio, and LOUIS O. DEHNEL, of Sandusky, in the county of Erie and State of Ohio, have invented a certain new and Improved Hose Relief-Gate; and we do hereby declare that the following is a full and complete description thereof, reference being had to the accompanying drawings, making a part of the same.

The nature of this invention relates to a gate, operating automatically, for relieving a hose from the force or strain resulting from the momentum of a stream of water flowing through the pipe when the said current of water is suddenly arrested, thereby preventing the hose from rupture or other injury resulting from such exposure to a great and sudden strain by quickly closing the discharge.

The gate may be attached either to a hydrant or to the engine. The hose leads off from the gate to the nozzle, so that in cutting off the water suddenly at the nozzle all the reacting strain and pressure upon the hose are relieved by the discharge of the water through the escape-opening of the gate; and at the same time the engine may continue in operation free from the labor and strain due to the pressure of water when it is rushing in full force through the pipes by the working of the engine, which gives the pipeman full control of the stream. By this means the firemen or others have easy and complete control of the hose and pipe, which can be carried up ladders and over perilous places without incurring danger from the writhing or jerking of the pipe when under unrelieved pressure, while at the same time the hose may be kept full of water and ready for instant use.

Of the construction and operation of the gate above alluded to the following is a description, of which the drawings are an illustration.

Figure 1:
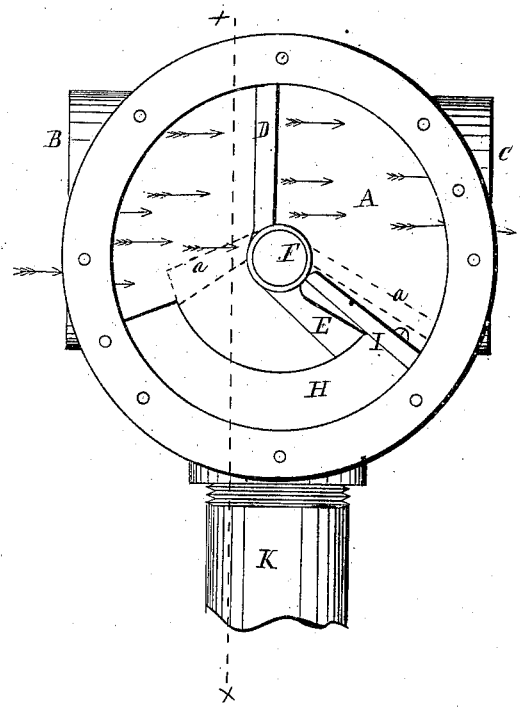
Figure 2:
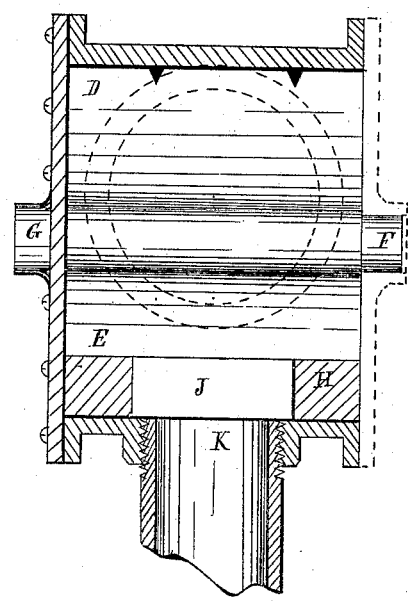

Figure 1 is an end view of the interior of the gate, the cover of which is removed that the interior may be seen. Fig. 2 is a transverse section in direction of the line *x x*.

Like letters of reference refer to like parts in the several views.

As shown in the drawings, A represents a cylindrical case having an induction opening or port, B, on one side, and an eduction-port, C, on the other, in line therewith. The dotted circles in Fig. 2 also indicate the eduction opening or port C.

In the ends of the cylinder is journaled a gate consisting of the two wings D and E, of which F is one of the journals, the opposite one being closed in its seat G.

It will be observed that the two wings of the gate are of unequal width or differing in size and area; that the wing D extends from its axis to the inner surface of the cylinder, at which point it is nearly close fitting, but not air-tight, whereas the shorter wing, E, extends to a segment or partial lining, H, against the surface of which the edge of the wing closely fits, but free to move thereon.

I is a partition-plate extending from the end of the segment H, the entire width of the cylinder, to the shaft or axis of the gate, and in close relation therewith, the object of which is to prevent the water, when passing through the cylinder in the direction of the arrows, (when the gate is in the position indicated by the dotted lines *a*,) from flowing back under the wing D to the outlet J. In case the water is running in a reverse direction of said arrows, the water is then arrested and prevented from passing the inlet at C and out at J; hence the partition I prevents the water from being discharged only from the outlets C and J, as shown. Through the segment H is an opening, J, into the pipe or outlet K, all of which are constructed and arranged substantially as set forth.

Steam fire-engines in operation force the volume of water through the hose with great velocity. The momentum of the stream, when suddenly arrested by the closing of the nozzle or stopping of the engine or otherwise, causes a heavy strain upon the hose between the nozzle and the engine, or between the nozzle and the hydrant, according to the connection. This violent pressure upon the hose often produces leakage and rupture, thereby disabling the engine for the time being, to avoid which is the purpose of this invention.

To this end port B of the gate may be secured to the engine and the hose may be secured to the engine and the cylinder. In this location of the gate the water drawn into the engine must pass through the cylinder of the gate, as indicated by the arrows. The position of the wings of the gate during this passage of the water is as indicated by the dotted lines a, thereby allowing a free and direct passage of the stream through the cylinder from B to C.

The water-passage in the cylinder being equal to the capacity of the suction-hose, no obstruction will occur to the full passage of as large a volume of water as the engine is capable of drawing; hence there is no embarrassment in the working of the engine, and a full discharge of water is forced through the nozzle.

The position of the wings of the gate, as indicated by the dotted lines a, is due to the superior width or greater surface of the wing D. The water impinges directly upon the surface of the wing D, thereby forcing it back, thus overcoming the less-resisting wing E, for the reason that it presents less surface to the stream, and, furthermore, is somewhat protected from the direct action of the stream by the segment H.

In the event of a sudden stoppage or checking of the water in the discharging hose or pipe attached to the eduction-port C, while the induction of water into the cylinder continues through the suction hose or pipe, the water flowing into the cylinder impinges upon the wing E, forcing it to the position shown in Fig. 2, there being no, or but little, resistance offered by the wing D; hence the water will flow from the cylinder through the outlet J and pipe K, thereby relieving the hose or pipe from the violence of the momentum of the arrested stream by its continuing to flow from the cylinder.

It will be obvious that by this means no undue strain is exerted upon the engine or hose to cause rupture or leakage.

On permitting the water to be again discharged from the eduction-port C, the water flowing into the cylinder, by impinging upon the greater surface of the wing D, and for its being more directly in the course of the stream, will be forced forward to the position indicated by the dotted lines a, thereby overcoming the resistance of the lesser wing, E, and closing the outlet J, compelling the volume of water to flow in the direction of the arrows.

The wings of the gate, by virtue of the great difference in their surfaces, are acted upon by the stream as levers differing in length; hence they readily yield to the stream impinging upon them, as the water may be shut off from the eduction-port C or be allowed to be discharged therefrom.

What we claim as our invention, and desire to secure by Letters Patent, is—

1. In a fire-engine hose, the gate consisting of the two wings D and E, having one common journal, in combination with the cylinder provided with ports B and C, segment H, and outlet J, substantially in the manner as described, and for the purpose set forth.

2. In a fire-engine hose, the partition I and segment H, in combination with the pivoted wings and cylinder provided with induction and eduction openings, substantially as described, and for the purpose specified.

JOHN HEIMLICH.
LOUIS O. DEHNEL.

Witnesses:
LOUIS TRAUB,
CAROLINE TRAUB.